C. L. AYGARN.
WAGON DUMP.
APPLICATION FILED MAR. 16, 1911.
1,005,497.
Patented Oct. 10, 1911.
3 SHEETS—SHEET 2.
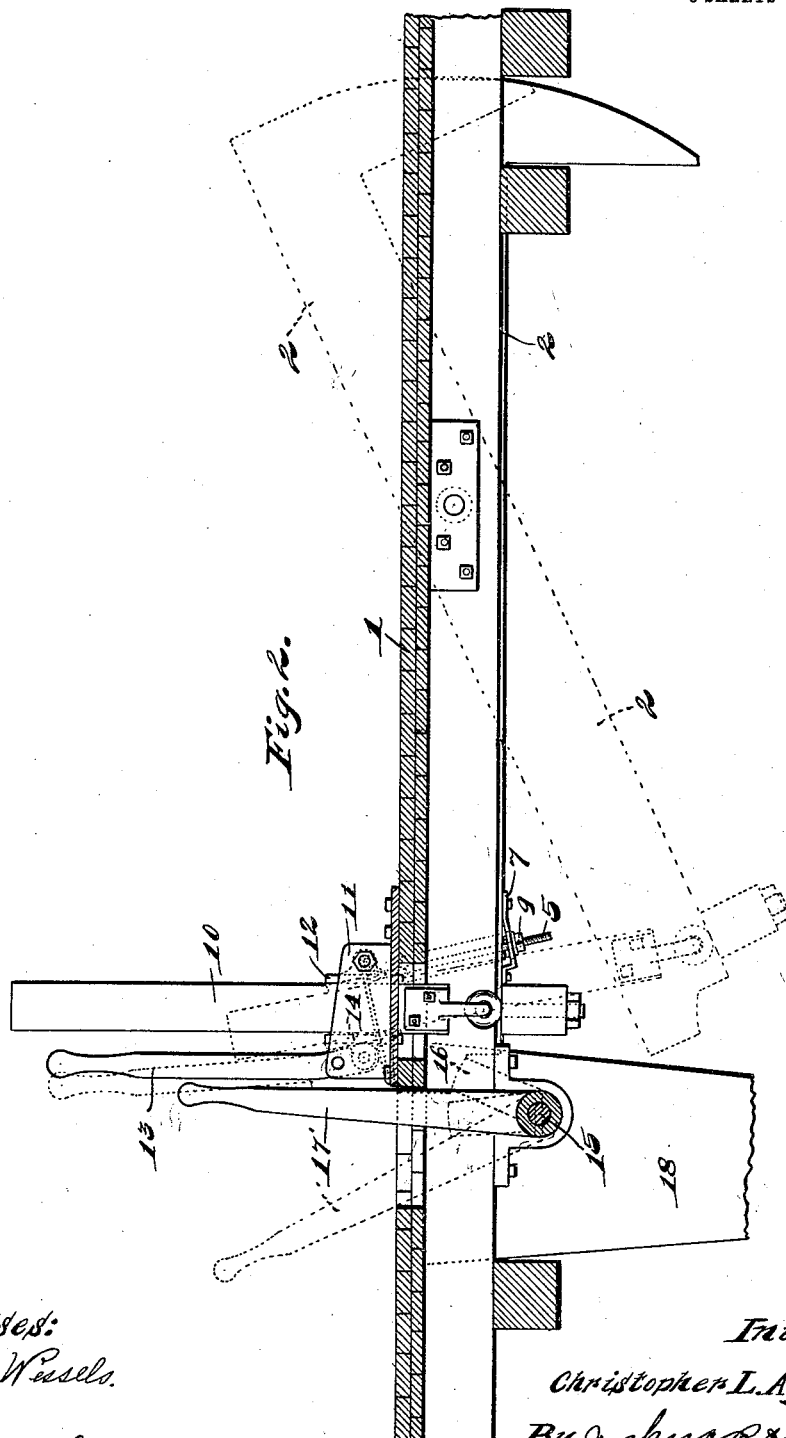
Witnesses:
C. E. Wessels.
B. G. Richards.
Inventor:
Christopher L. Aygarn,
By Joshua R. H. Potts
his Attorney.

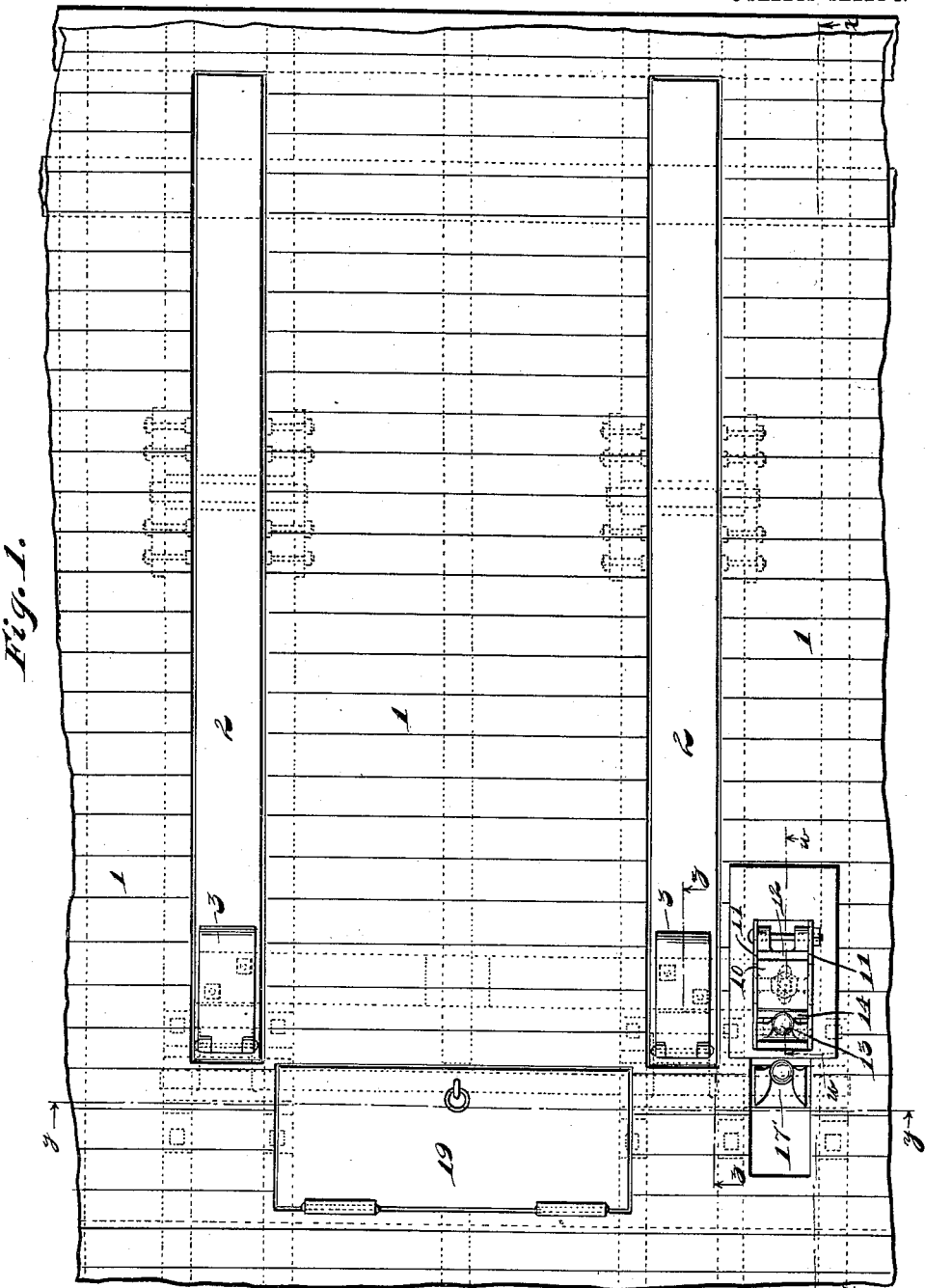

C. L. AYGARN.
WAGON DUMP.
APPLICATION FILED MAR. 16, 1911.
1,005,497.
Patented Oct. 10, 1911.
3 SHEETS—SHEET 3.
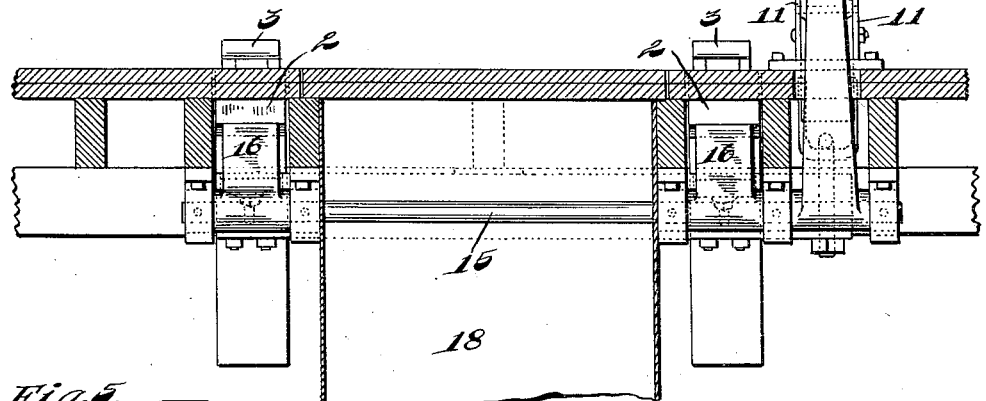
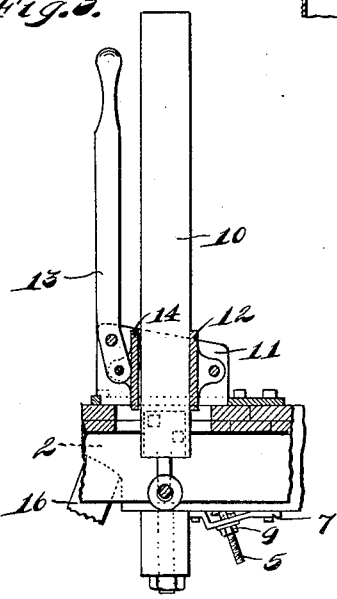
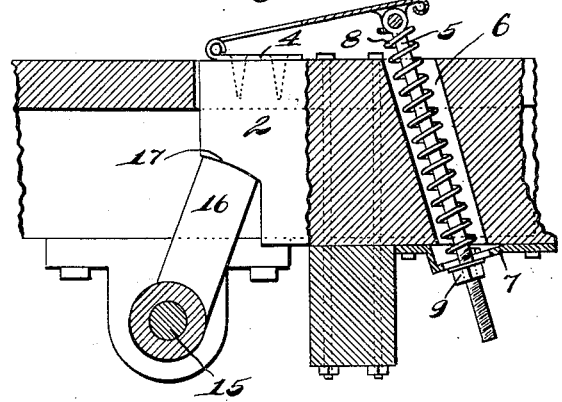
Witnesses:
C. E. Wessels.
B. J. Richards.
Inventor:
Christopher L. Aygarn,
By Joshua R. H. Potts
his Attorney.

UNITED STATES PATENT OFFICE.

CHRISTOPHER L. AYGARN, OF SENECA, ILLINOIS.

WAGON-DUMP.

1,005,497.  Specification of Letters Patent.  Patented Oct. 10, 1911.

Application filed March 16, 1911. Serial No. 614,910.

*To all whom it may concern:*

Be it known that I, CHRISTOPHER L. AYGARN, a citizen of the United States, and a resident of the city of Seneca, county of Lasalle, and State of Illinois, have invented certain new and useful Improvements in Wagon-Dumps, of which the following is a specification.

My invention relates to improvements in wagon dumps especially adapted for use in unloading grain wagons, and the object of the invention is to provide an improved wagon dump, which shall be efficient and safe in operation.

The invention consists in the combinations and arrangements of parts hereinafter described and claimed.

The invention will be best understood by reference to the accompanying drawings forming a part of this specification and in which, Figure 1, is a top plan view of a portion of a wagon dump embodying my invention, Fig. 2, a section of the wagon dump taken on line $x$—$x$ of Fig. 1, Fig. 3, a section of the dump taken on line $y$—$y$ of Fig. 1, Fig. 4, a section of the dump taken on line $z$—$z$ of Fig. 1, and Fig. 5, a partial section of the dump taken on line $w$—$w$ of Fig. 1.

The preferred form of construction as illustrated in the drawings comprises a platform 1 designed and arranged to permit of the driving of a loaded wagon thereon. A pair of wheel tracks 2 is pivoted in platform 1 in position to receive the wheels of a wagon driven thereon. Each of the tracks 2 is provided at its lowering end with a swinging wheel stop 3 hinged to a plate 4 secured to the end of the wheel track. A spring rod 5 is pivoted to the inner end of each of the wheel stops 3 and passes downwardly through a perforation 6 in the corresponding wheel track. A perforated stop plate 7 is secured to the bottom of each of the wheel tracks and a spring 8 is imprisoned between said stop plate and the corresponding wheel stop 3 and serves to hold the wheel stop in normally operative position. A stop 9 is threaded on the lower end of each of the rods 5 and serves to limit the upward movement of the corresponding wheel stop. By this arrangement it will be observed that when the wheels of a wagon are driven onto wheel tracks 2, the wheel stops 3 will be automatically depressed to permit the passage of the wagon wheels and the spring 8 will automatically return said wheel stops to operative position to prevent retrograde movement of the wagon wheels on said wheel track.

A braking member 10 is pivotally connected to wheel tracks 2 and projects upwardly through a suitable opening in platform 1 as indicated in Fig. 2. A housing 11 is mounted on platform 1 around braking member 10 and a brake shoe 12 is pivoted in housing 11 and bears against one side of member 10. A brake lever 13 is pivoted in the other side of housing 11 and carries a brake shoe 14 pivoted to its lowering end and adapted to be applied to the other side of braking member 10. By this arrangement it will be observed that when it is desired to permit tilting of wheel tracks 2, the tilting movement thereof may be readily controlled by means of brake lever 13, and thus a too sudden movement prevented.

A lock shaft 15 is pivoted under platform 1 and carries locking projections 16 adapted to engage shoulders 17 provided in the ends of wheel tracks 2 to lock said wheel tracks in receiving position flush with platform 1. Lock shaft 15 carries an operating arm 17' projecting upwardly through a suitable opening in platform 1 as indicated. By this arrangement it will be observed that the wheel tracks 2 may be readily locked in receiving position or released for tilting to dump a wagon thereon.

A suitable grain receiving hopper or chute 18 is also provided in platform 1, and provided with an upwardly swinging top 19 locked just behind the receiving ends of wheel tracks 2. In use wheel tracks 2 are locked in receiving position and top 19 of hopper 18 closed to permit horses to walk thereover. Then a loaded wagon is driven onto the platform with its wheels passing onto wheel tracks 2 over wheel stops 3. Then hopper door 19 is opened and wheel tracks 2 unlocked by means of operating arm 17, the brake shoe 14 being simultaneously applied to braking member 10 by means of brake lever 13. Wheel tracks 2 are pivoted well forward of the middle so that the weight of the wagon tends to tilt the wheel tracks into position, indicated in the dotted lines in Fig. 2, said movement being controlled by means of brake lever 13, so as to prevent a too sudden movement, wheel stops 3 serving to prevent the wagon from rolling down the inclined wheel tracks. This causes dumping of the contents of the wagon into hopper 18 whence said contents are removed by any siutable means. Then the horses are caused to draw the wagon off the wheel tracks 2 which causes the return of said tracks to normal position in which they are locked by means of operating arm 17 as before. By this construction it will be observed that the wagon may be readily dumped by a single operator, and that there is no danger of the horses backing the wagon onto the operator while opening hopper cover 19, and a too sudden tilting of the wagon which would tend to frighten the horses or dislodge the wagon from the wheel tracks.

While I have illustrated and described the preferred form of construction for carrying my invention into effect, this is capable of variation or modification without departing from the spirit of the invention. I, therefore, do not wish to be limited to the exact details of construction set forth, but desire to avail myself of such variations and modifications as fall within the scope of the appended claims.

Having described my invention what I claim as new and desire to secure by Letters Patent is:

1. A wagon dump comprising a platform; a pair of wheel tracks pivoted in said platform; swinging wheel stops pivoted to the lowering ends of said tracks; spring rods pivoted to said stops and passing through said tracks; springs on said spring rods and arranged to hold said stops normally in operative position; and a hopper adapted to receive the contents of a dumped wagon, substantially as described.

2. A wagon dump comprising a platform; a pair of wheel tracks pivoted in said platform; swinging wheel stops pivoted to the lowering ends of said tracks; spring rods pivoted to said stops and passing through said tracks; springs on said spring rods and arranged to hold said stops normally in operative position; a braking member connected with said tracks and projecting upwardly through said platform; a manually operable brake arranged to engage said braking member; and a hopper adapted to receive the contents of a dumped wagon, substantially as described.

3. A wagon dump comprising a platform; a pair of wheel tracks pivoted in said platform; a braking member pivotally connected with said tracks and projecting through said platform; a housing mounted on said platform around said braking member; a brake shoe pivoted in said housing and contacting with one side of said braking member; a brake lever pivoted in said housing; a brake shoe pivoted to said lever and adapted to be applied to the other side of said braking member by said lever; and a hopper adapted to receive the contents of a dumped wagon, substantially as described.

4. A wagon dump comprising a platform; a pair of wheel tracks pivoted in said platform; a braking member pivotally connected with said tracks and projecting upwardly through said platform; a housing mounted on said platform around said braking member; a brake shoe pivoted in said housing and contacting with one side of said braking member; a brake lever pivoted in said housing; a brake shoe pivoted to said lever and adapted to be applied to the other side of said braking member by said lever; swinging wheel stops pivoted to the lowering ends of said tracks; spring rods pivoted to said stops and passing through said tracks; springs on said spring rods and arranged to hold said stops normally in operative positions; and a hopper adapted to receive the contents of a dumped wagon, substantially as described.

In testimony whereof I have signed my name to this specification in the presence of two subscribing witnesses.

CHRISTOPHER L. AYGARN.

Witnesses:
HELEN F. LILLIS,
JOSHUA H. POTTS.